(12) United States Patent
Topf

(10) Patent No.: US 7,476,066 B2
(45) Date of Patent: Jan. 13, 2009

(54) DRILLING DEVICE PROVIDED WITH A MULTI-BLADED DRILLING TOOL, ESPECIALLY A DEEP DRILLING TOOL

(75) Inventor: Ernst Topf, Oberboihingen (DE)

(73) Assignee: TBT Tiefbohrtechnik GmbH + Co. (DE)

( * ) Notice: Subject to any disclaimer, the term of this patent is extended or adjusted under 35 U.S.C. 154(b) by 617 days.

(21) Appl. No.: 10/509,961

(22) PCT Filed: Apr. 2, 2003

(86) PCT No.: PCT/EP03/03411

§ 371 (c)(1),
(2), (4) Date: Oct. 4, 2004

(87) PCT Pub. No.: WO03/082515

PCT Pub. Date: Oct. 9, 2003

(65) Prior Publication Data

US 2005/0163578 A1 Jul. 28, 2005

(30) Foreign Application Priority Data

Apr. 3, 2002 (DE) .......................... 202 05 861 U

(51) Int. Cl.
*B23B 51/06* (2006.01)
(52) U.S. Cl. .............................. 408/56; 407/11; 408/59; 408/227
(58) Field of Classification Search .................. 408/56, 408/57, 59, 230, 227; 407/11; 279/20; *B23B 51/00, B23B 51/02, 51/06*
See application file for complete search history.

(56) References Cited

U.S. PATENT DOCUMENTS

| 129,543 | A | * | 7/1872 | Ells ............................ 408/230 |
| 329,174 | A | * | 10/1885 | Johnson ...................... 408/230 |
| 390,672 | A | * | 10/1888 | Holmes ....................... 408/230 |
| 472,541 | A | * | 4/1892 | Johnson ...................... 408/230 |
| 542,223 | A | * | 7/1895 | Johnson ...................... 408/230 |
| 1,310,319 | A | * | 7/1919 | Baumann ..................... 408/143 |
| 1,322,399 | A | * | 11/1919 | Baumann ..................... 408/199 |
| 3,443,819 | A | | 5/1969 | Benjamin et al. |
| 3,726,363 | A | * | 4/1973 | Sussman ..................... 184/39.1 |
| 3,781,024 | A | * | 12/1973 | Ganser et al. ................ 279/20 |
| 4,137,002 | A | * | 1/1979 | Barker et al. ................. 408/59 |

(Continued)

FOREIGN PATENT DOCUMENTS

DE 29 46 103 A1 5/1981

(Continued)

*Primary Examiner*—Daniel W Howell
(74) *Attorney, Agent, or Firm*—Akerman Senterfitt

(57) ABSTRACT

The invention relates to a multi-bladed deep drilling tool (17) comprising a cooling lubricant channel (19, 20) provided for each chip space (74) allocated to each cutter (71). Said channels (19,20) are supplied with a lubricant independently from each other, by means of either jointly drives or separately drives lubricating pumps (25, 26). Said channels being associated with either the drilling devise (11) or integrated into an adapter (30) which is pivoted with a common flow of lubricant, but which supplies independent individual flows. Lubrication of the individual cutting zones is guaranteed even if the chip removal channel is blocked, by chips for example. The pressure of the cooling lubricant channel increases in said area whereupon the channel in question is cleared.

25 Claims, 5 Drawing Sheets

U.S. PATENT DOCUMENTS

| | | | | |
|---|---|---|---|---|
| 4,268,197 | A * | 5/1981 | Burgsmuller | 408/59 |
| 4,529,340 | A * | 7/1985 | O'Dell | 408/1 R |
| 4,950,108 | A * | 8/1990 | Roos | 408/59 |
| 5,006,021 | A * | 4/1991 | Wheetley | 408/1 R |
| 5,829,926 | A | 11/1998 | Kammermeier | |
| 6,056,486 | A * | 5/2000 | Colvin | 408/59 |
| 6,315,504 | B1 | 11/2001 | Sekiguchi et al. | |
| 6,808,342 | B2 * | 10/2004 | Kress et al. | 409/136 |
| 2001/0033780 | A1 | 10/2001 | Berglund et al. | |

FOREIGN PATENT DOCUMENTS

| | | | | |
|---|---|---|---|---|
| JP | 59076749 | A | * | 5/1984 |
| JP | 63102814 | A | * | 5/1988 |
| JP | 63216610 | A | * | 9/1988 |
| JP | 63216611 | A | * | 9/1988 |
| JP | 63237807 | A | * | 10/1988 |
| JP | 63260710 | A | * | 10/1988 |
| JP | 63260711 | A | * | 10/1988 |
| JP | 63267108 | A | * | 11/1988 |
| JP | 63267109 | A | * | 11/1988 |
| JP | 11 320213 | A1 | | 11/1999 |
| SU | 569401 | A | * | 9/1977 |
| SU | 854608 | A | * | 8/1981 |
| SU | 1077718 | A | * | 3/1984 |
| SU | 1148721 | A | * | 4/1985 |
| SU | 1611595 | A | * | 12/1990 |
| WO | WO 95/26247 | A1 | | 10/1995 |

* cited by examiner

DRILLING DEVICE PROVIDED WITH A MULTI-BLADED DRILLING TOOL, ESPECIALLY A DEEP DRILLING TOOL

FIELD OF APPLICATION AND PRIOR ART

The invention relates to a drilling device with a multiblade drilling tool, particularly a deep drilling tool, having at least two supply channels by means of which cooling lubricant is supplied to the cutting zone.

In addition to the frequently used single-flute deep drilling tools, use is also made of multiblade deep drilling tools, together with other drilling tools such as e.g. twist drills. In the case of heavy duty drills, particularly deep drilling tools, the cutting zone is supplied with cooling lubricant along penetrating channels via the drill and this serves to cool said cutting zone, lubricate guide sections of the drill located in the hole and in particular remove the chips arising during drilling. For this purpose chip removal channels are provided in the drill, e.g. in the form of an axially directed recess (mainly in the case of deep drilling tools) or helical channels in the case of so-called twist drills.

Whereas in the case of single-flute drills having only a single blade, the chip space or chamber formed upstream of the blade and correspondingly also the removal channels are relatively large, with multiblade drills the cross-section thereof is limited. With long-chip materials, e.g. in the case of steel as opposed to aluminium or cast material, the long, helical chips formed easily lead to blocking or clogging of the chip removal channels.

PROBLEM AND SOLUTION

The problem of the present invention is to ensure the supply of the cutting zone in the case of drilling devices of the aforementioned type, i.e. multiblade drilling tools, even with clogging-prone materials.

According to the invention this problem is solved in that with the channels are associated independent cooling lubricant supply devices. These are preferably constructed for maintaining predetermined, separate volume flows of the cooling lubricant for the individual channels.

It is assumed that with each blade is associated a supply channel for the cooling lubricant normally issuing into the drill end face following on to the leading blade and supplies the chip space of the following blade behind the same in the rotation direction. This produces the chips which are removed in the chip space and the following chip removal channels through the hole. If clogging occurs in one of the chip spaces and the associated removal channels as a result of long chips and in particular chip balls which form, as a result of the independent supply with lubricant of the associated supply channel it is ensured that said blade and its chip space, together with the following chip removal channel are still supplied with lubricant. If all the supply channels were connected to the same cooling lubricant supply device, e.g. a common pump or pressure line, then if clogging occurred the cooling lubricant pressure would only insignificantly rise and a correspondingly larger quantity would flow therefrom to the supply channel belonging to the unclogged channel system. This would not put an end to clogging or blocking and the associated blade would not receive an adequate cooling lubricant quantity. This can bring about seizing up and damage or destruction of the complete drill and workpiece. The bore or hole wall can be damaged by the clogging in the outwardly open removal channels.

According to the invention, in advantageous manner the supply devices are constructed for increasing the cooling lubricant pressure in the case of a reduction of the volume flow in one of the channels as a result of clogging. Thus, the pressure rises in accordance with the supply device design to such an extent that the blockage is removed.

This can be brought about in that to the channels are in each case connected independent pumps or independent pump chambers in the case of pumps having several chambers. However, it is also possible to connect the channels to outlets of a quantity divider. Such a quantity divider e.g. operates in the manner of a gear pump with several chambers, which are driven by the supplied medium and at their individual outlets in each case deliver predetermined, e.g. identical volume flows. These are substantially independent of the pressures prevailing in the individual outlet lines, apart from the clearance losses in the quantity divider mechanism, etc. As a result it is possible to implement the invention even in the case of a drilling device with only a central supply for the cooling lubricant. The quantity divider, like the separate supply lines to the channels, can be provided in an adapter, which is connected to a drilling spindle and e.g. contains the chuck for the drill. However, it is also possible to bring about the above-described behaviour of the cooling lubricant pressure and volume flow in the individual channels by a corresponding volume/pressure control or to modify, e.g. increase the same compared with the natural pressure rise on reducing the volume flow. It is also possible in this case to produce specific pressure impulses or surges, which contribute to a release of blockages. This could take place by the provision of pressure and/or quantity sensors in the independent supply line systems by means of an electronic or hydraulic control device acting on pumps and/or valves.

The introduction of the cooling lubricant into the individual channels in an independent manner can take place in different ways. The prerequisite is that there are separate supply channels in the tool. These can have axial, radial or axial and radial inlets in the area remote from the drill point, which are generally supplied by means of rotary ducts with circulating ring grooves. These can once again be integrated into or connected to the previously described adapter or drilling spindle.

The invention also proposes a drilling device in which the chip spaces formed in front of the blades in the working rotation direction of a multiblade drilling tool and which are connected to the chip removal channels, have a rounded side wall connected to the blade. Conventionally the chip spaces in the cutting heads of drilling tools are circular segmental in cross-section. This also applies for twist drills, where admittedly as a result of the helical shape of the chip space or the removal channels a rounding is present, but which still have a substantially circular segmental cross-section. The angular corner which forms close to the drill centre and also the corners formed between the bore wall and the chip space boundary form attachment points where chips can become attached and adhere so as to form starting points for blockages.

As a result of the rounded side wall not only is a relatively large chip space created, particularly if it extends up to the centre plane of the drill perpendicular to the blade, but said sharp corners are avoided. In addition, chip guidance surfaces are created along which the chips slide down and "screw" outwards e.g. in a helical manner through the removal channels, which preferably have the same shape with rounded side walls.

Moreover, due to the fact that in this construction a projection projecting circumferentially into the chip space is created, despite a large chip space a surface is formed acting as a guidance zone for the drill and which is e.g. somewhat increased in diameter compared with the standard drill circumference and consequently serves as a work guide. Particularly with an asymmetrical blade arrangement, it absorbs reaction pressures and ensures a precise guidance of the drill in the already formed hole, which renders possible axial precise drilling, particularly with deep drills.

A further inventive measure for preventing blockages and removal problems with respect to long chips formed, is brought about in that a multiblade drilling tool, considered in an axial plan view on the drill end, has a bend on one of the blades where the two blade sections meet under an angle, which is preferably between 170ø and 120ø. This can e.g. arise in that at some distance from the drill centre the blade bends in the rotation direction or passes with a radius into a new orientation. Thus, the chip space is further enlarged. The bent blade ensures that the chips break more easily and do not arise as a relatively wide, coiled strip which can stick in the removal channels. Instead two tightly juxtaposed, narrower chip strips are formed, which should really still adhere in the centre, but as a result of the different formation conditions the chip can tear longitudinally and also transversely, which leads to a chip pattern corresponding to a short-chip material. This measure can in the case of a two-blade drill e.g. be provided on both blades, so that the drill once again has a symmetrical cutting pattern, but is advantageously only provided on one blade. In this case, as a result of the different cutting geometry, deliberately a transverse force is produced on the drill head, which for a clear engagement presses one of the guide zones onto the hole wall and consequently prevents all guidance problems as a result of the mutual engagement of the drill. Thus, a deliberate asymmetry of the blades is created.

The present invention is particularly advantageous for deep drilling, but also provides advantages for other drilling work, e.g. cooling duct twist drills and countersinks. It is also appropriate with a double and multiple supply of cooling lubricant to one blade.

These and further features can be gathered from the claims, description and drawings and the individual features, both singly or in the form of subcombinations, can be implemented in an embodiment of the invention and in other fields and can represent advantageous, independently protectable constructions for which protection is claimed here. The subdivision of the application into individual sections and the subheadings in no way restrict the general validity of the statements made thereunder.

BRIEF DESCRIPTION OF THE DRAWINGS

Embodiments of the invention are described hereinafter relative to the attached drawings, wherein show.

PREFERRED EMBODIMENTS

Figure 1:
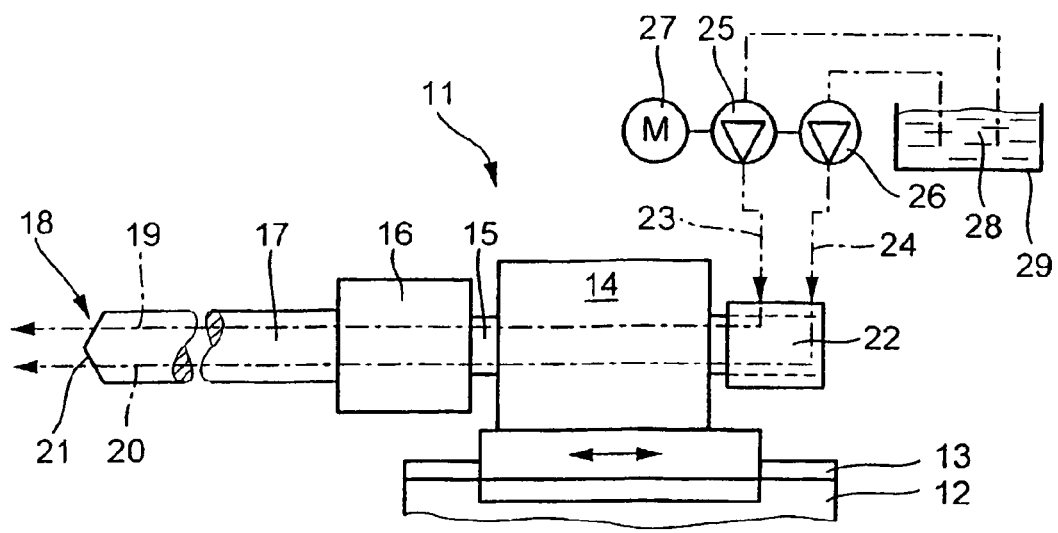
FIGS. 1 to 4 Diagrammatic side views of a drilling device with different paths for the cooling lubricant supply.

FIG. 1 shows a drilling device 11 with a machine frame 12 on which a headstock 14 is horizontally displaceable on a carriage 13 and is guided in infeed manner corresponding to the drilling advance. A drilling spindle 15 is mounted in rotary and drivable manner in the headstock 14. On one side of the drilling spindle a drilling tool 17, e.g. a deep drilling tool is clamped in a chuck 16. In the manner described hereinafter, said tool has two cooling lubricant supply channels 19, 20 running longitudinally up to its cutting zone 18 at the free end and which issue into the drilling tool end face 21 forming said cutting zone.

At the end of the drilling spindle 15 opposite to the drilling tool is provided a rotary duct 22 receiving cooling lubricant for the hole or bore by means of two separate supply lines 23, 24. The latter are supplied by two separate pumps 25, 26 or two pump chambers of the same pump, which can be driven by a common motor 27. They draw the cooling lubricant 28 out of a storage tank 29. In a manner to be described hereinafter relative to FIG. 9, in the rotary ducts the cooling lubricant coming from the machine-fixed supply lines 23, 24 are introduced into axial channels in the rotary drilling spindle and from there into the drilling tool in such a way that each of the channels 19, 20 receives cooling lubricant, except for the transfer leakage losses, from in each case one of the supply lines 23, 24.

FIG. 1 shows that the supply lines 23, 24 issue radially into the rotary duct 22, where the line path is transformed into an axial guide within the drilling spindle from where it is passed into axial channels in the drilling tool.

Figure 2:
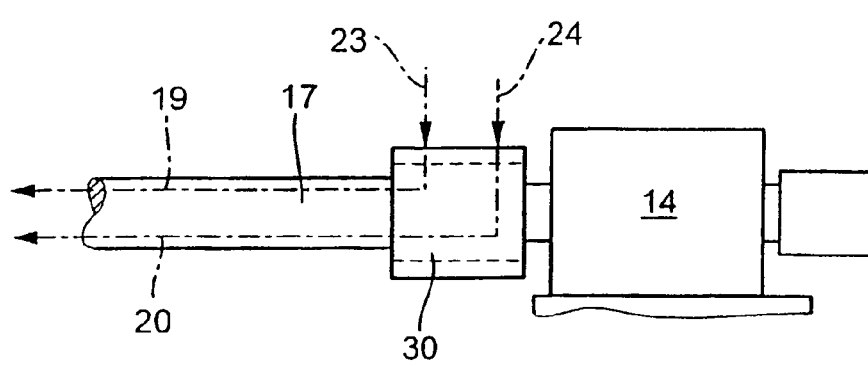
Figure 9:
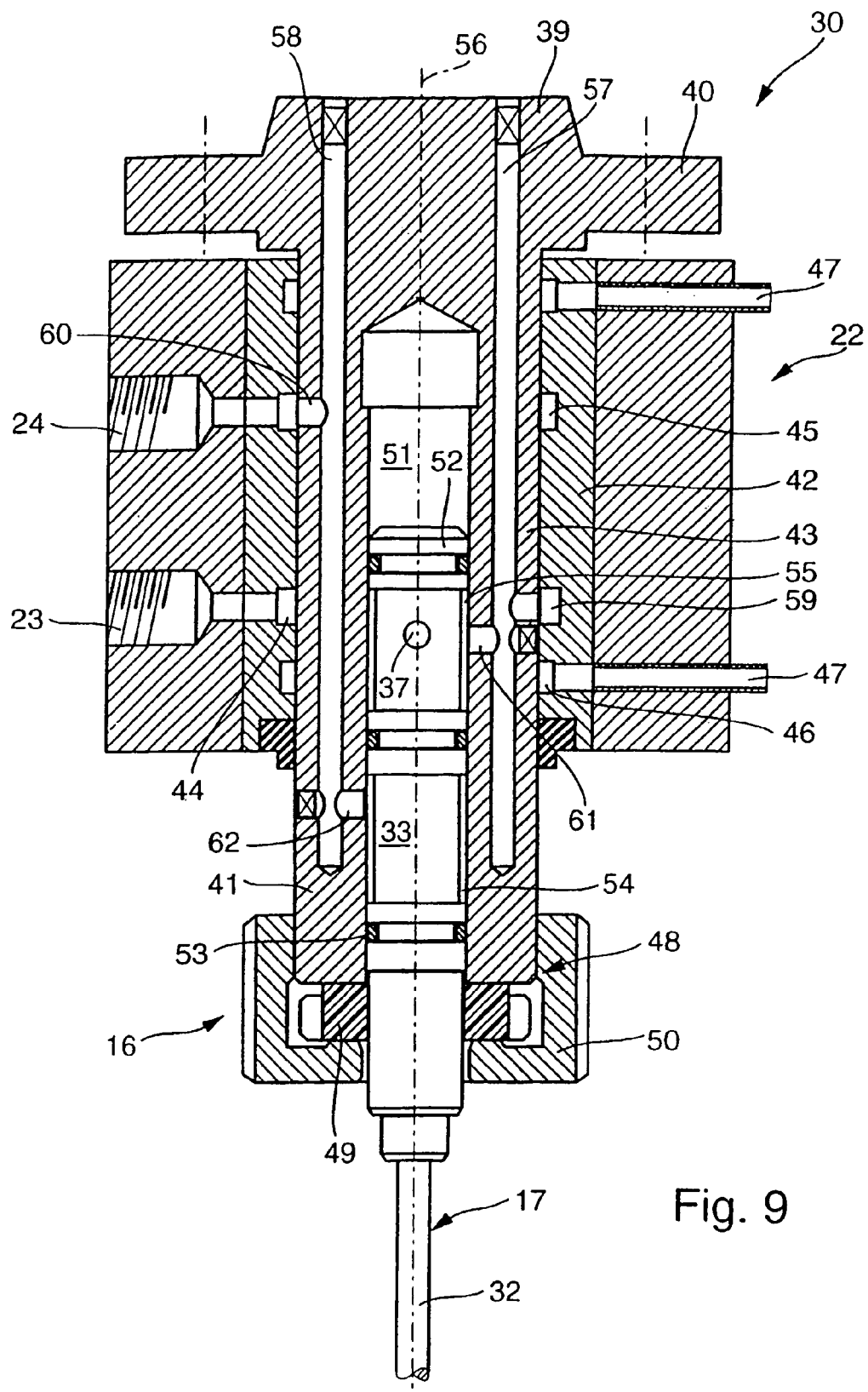
FIG. 9 An adapter with a rotary duct for the lubricant.

FIG. 2 shows a construction of a drilling device 11 corresponding in principle to FIG. 1, where the supply lines 23, 24 are connected to an adapter 30, as shown in FIG. 9. There is no rotary duct transferring the cooling lubricant from the connected to rotate supply lines, but which are axially displaceable with the headstock 14 to an inner part rotatable with the drilling spindle and drilling tool, from where introduction takes place into the channels 19, 20 of the drilling tool 17.

Figure 3:
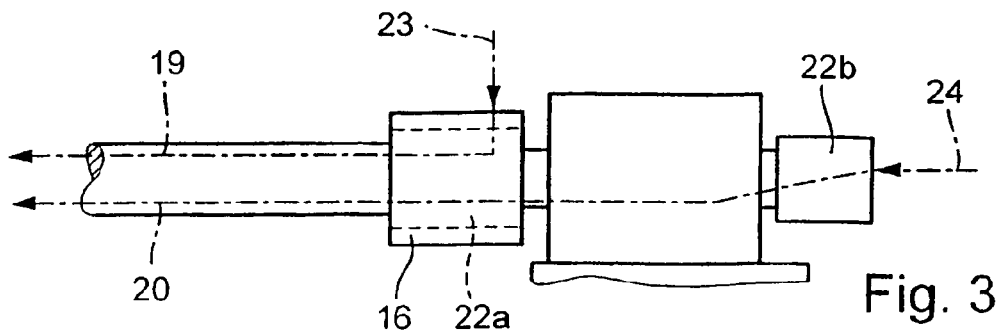

FIG. 3 shows a construction in which the supply to the channel 19 takes place by means of a rotary duct 22a at the chuck 16 or an adapter part, introduction taking place radially.

Channel 20 is supplied by means of a rotary duct 22b which, much as in FIG. 1, is located at the spindle end, where introduction of the lubricant takes place by means of an axial infeed 24. This construction can be advantageous if the drilling device already has a cooling lubricant guide for a single channel and for application of the invention a second, independent supply line is added.

Figure 4:
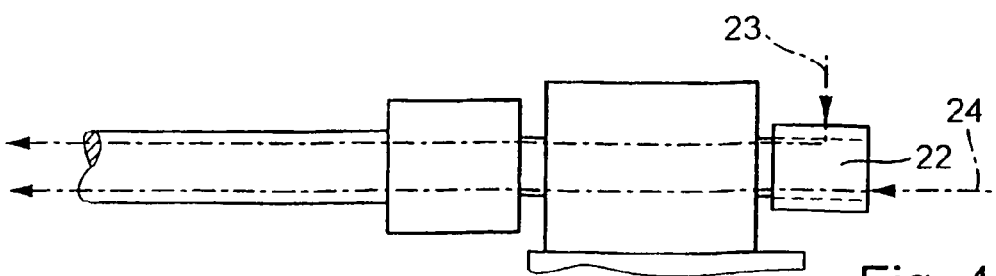

FIG. 4 diagrammatically shows a construction in which, much as in FIG. 1, the supply lines are connected to a rotary duct located at the drilling spindle end, but with a supply line 23 with an axial and a supply line 24 with a radial issuing into the same.

Figure 5:
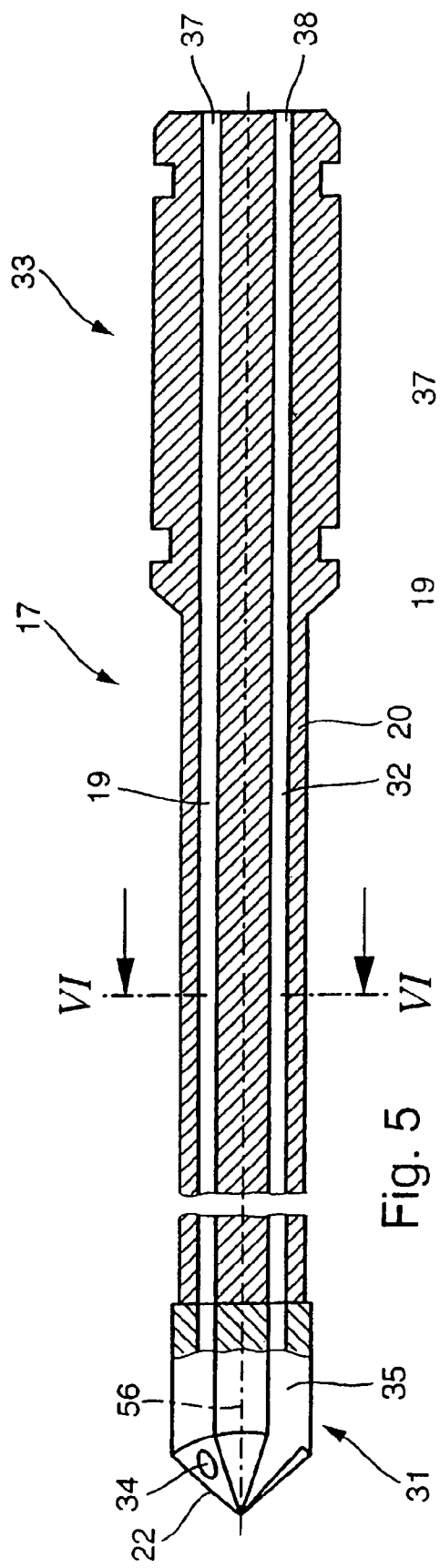
FIG. 5 A diagrammatic longitudinal section through a deep drilling tool.
Figure 6:
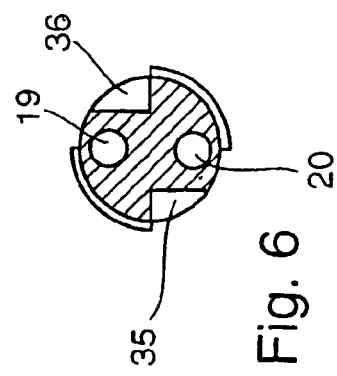
FIG. 6 A cross-section along line VI-VI in FIG. 5.

FIG. 5 shows a section through a deep drilling tool 17. It contains a cutting head, which is mainly made from hard material and is fitted, e.g. by soldering, to an elongated shank 32 which can be referred to as a pipe. The latter is in one piece or connected to a clamping head 33, which can be clamped in a clamping chuck on the drilling spindle. In the examples shown, the cutting head, shank and clamping head 33 contain two channels 19, 20, which pass as through, particularly mutually aligned, axially parallel bores through the entire tool and have their openings 34 in the cutting head end face 22. In the cutting head and shank are formed two chip removal channels 35, 36 (cf. FIG. 6), which are constructed as segment-like cutouts in the otherwise circular cylindrical cross-section of shank and cutting head. FIGS. 1 and 6 show a full or solid material shank construction. In the construction according to FIG. 5, the channels associated with the supply channels are guided independently of one another through the drilling spindle (coolant infeed according to FIG. 1 or 4).

Figure 7:
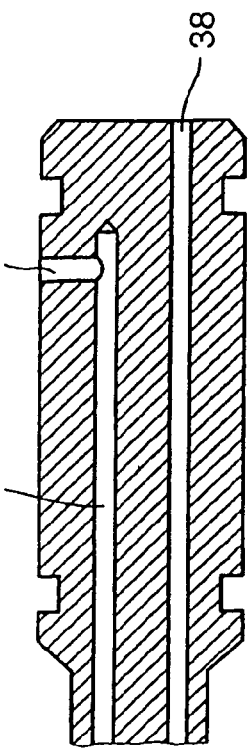
FIGS. 7 & 8 Details of other embodiments of a drill according to FIG. 5 with different cooling lubricant supplies.

In the embodiment according to FIG. 5 the connection of the channels 19, 20 in the drilling tool 17 is axial, i.e. the corresponding channels in the drilling spindle or clamping head end in an axial end face and there ring seals surrounding the channels are provided. This could be a drilling device according to FIG. 1 or 4. Instead of frontal inlets 37, 38 according to FIG. 5, the construction according to FIG. 7 has a frontal inlet 38 and a radial inlet 37, formed by a connecting bore to the blind hole-like channel 19. This construction would be suitable for a drilling device according to FIG. 3.

Figure 8:
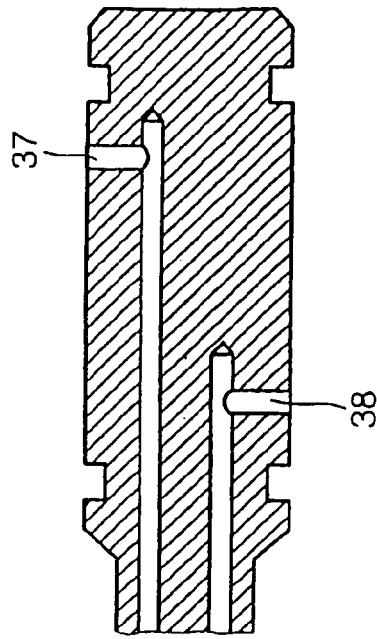

FIG. 8 shows an example in which two radial inlets 37, 38 are axially spaced from one another and are supplied by means of corresponding ring channels in the adapter or clamping head.

FIG. 9 shows an adapter containing a rotary duct 22. The adapter has a body 39, which is to be connected by means of a flange 40 and screws symbolized by their centre lines to the rotary drilling spindle. The rotary duct 22 is placed on the cylindrical section 41 in the form of a ring 42 surrounding said section 41 and which is provided on its inner face 43 with two axially spaced annular grooves 44, 45, which are connected to the cooling lubricant connections 23, 24 by means of radial bores. Ring 42 can rotate on the cylindrical section 41 of body 39, but is so arranged or so sealed by not shown sealing rings that there is no significant connection between the cooling lubricant flows from the supply lines 23 and 24. At both ends of the ring 42 are provided further annular grooves 46, which are used for removing any leaking oil and for this purpose are connected to corresponding leaking oil drains 47.

In the body 39 is provided a central, inner bore, which extends from the drilling tool-side end 48 over and beyond the annular groove 45 and which serves to receive the clamping head 33 of drilling tool 17. The latter is fixed by means of a clamp nut 49 with associated screw cap 50 to the adapter and consequently form the chuck 16. In the interior of the bore 51 is located the clamping head 33 passing over three double ring webs 52 in each case forming between them a groove in which is located an O-ring 53, thereby bounding two ring chambers 54, 55 sealed against one another. In the vicinity of these sections bounded by the ring chambers issue the tool inlets 37, whose inlet design is similar to that of FIG. 8.

In the tubular wall of body 39 are provided, parallel to the system centre axis 56, holes 57, 58, from which cross-holes 59, 60 extend to the annular grooves 44, 45. Thus, independently of one another, they are connected to the supply lines 23, 24 and via further cross-holes 61, 63 to the ring chambers 54, 55. From there the cooling lubricant can flow into the channels 19, 20 in the drill via inlets 37 in section 55 and 38 in section 54 (cf. FIG. 8). The longitudinal and transverse channels are in part constructed as drilled-through channels with terminating pieces. Thus, it is clear that the adapter can be placed on the spindle, e.g. of a deep drilling machine and on the one hand has the chuck and on the other the rotary duct for an independent double guidance of the cooling lubricant.

Figure 10:
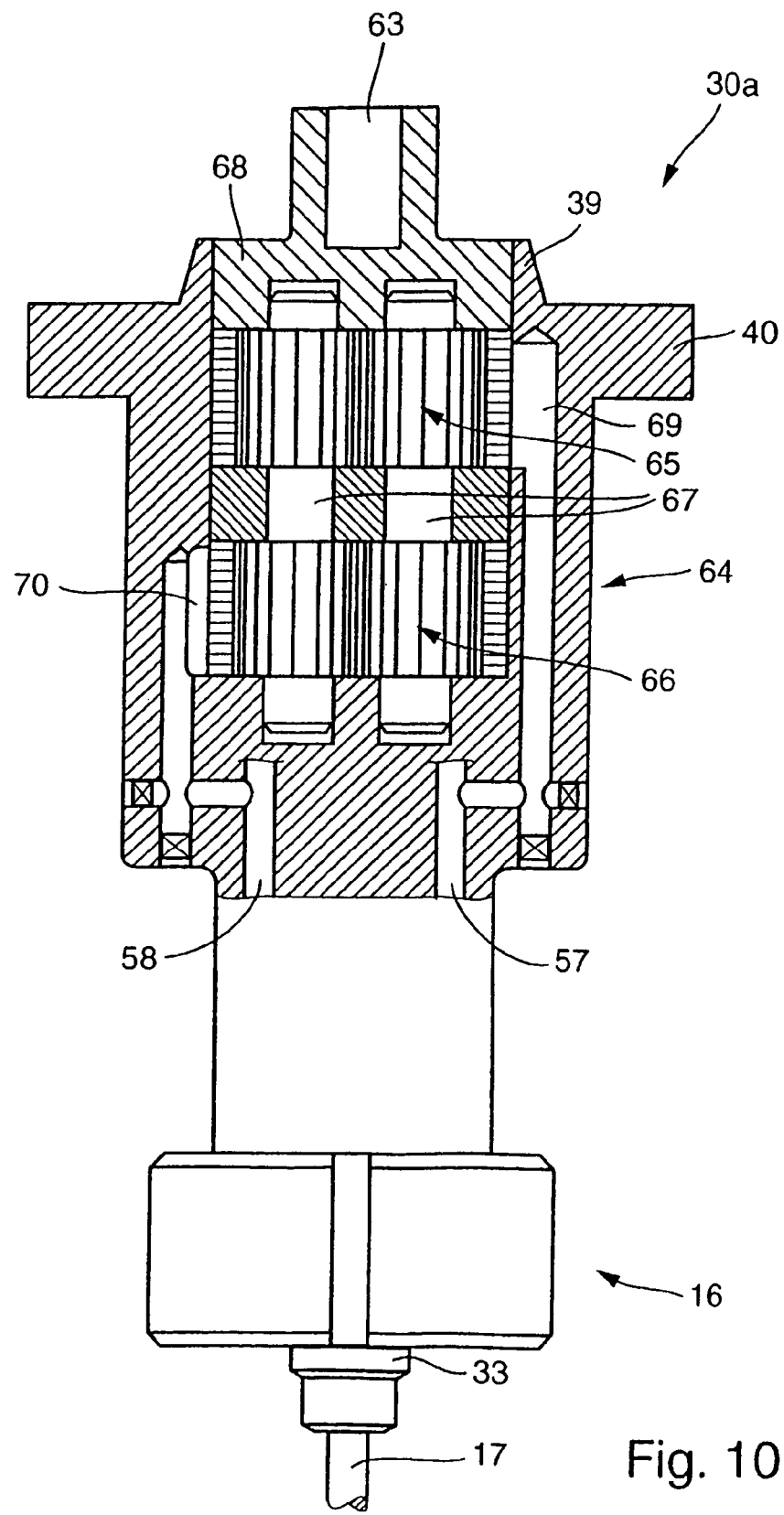
FIG. 10 An adapter with a quantity divider for cooling lubricant.

Whereas FIG. 9 with respect to the cooling lubricant volume and pressure requires independently supplied or controlled supply lines 23, 24, the adapter 30a of FIG. 10 can be connected to a drilling device, which only has a common cooling lubricant supply line 63. In the embodiment shown it is supplied through the drilling spindle to which the adapter is connected by means of the flange 40 on its body 39.

A quantity divider 64 is integrated into the adapter 30a and is directly installed in the body 39 and constructed in the manner of a double gear pump. It correspondingly comprises two double gear pairs 65, 66, whose gears are arranged in spaced manner in each case on one shaft 67 and are mounted in rotary manner in the body 39 or a pump-closing cover 68, which also carries the supply line 33. In each case one side of the meshing gear pairs is connected to the supply line 63, whilst the other side is connected to two independent chambers 69, 70, which are connected by means of a system of longitudinal and cross-holes to the longitudinal holes 57, 58, whose construction and function can correspond to those of FIG. 9. The connection of the drilling tool 17 in the remaining part of the adapter can also correspond to that of FIG. 9.

Thus, the quantity divider also has the common pressurized cooling lubricant supply line 63, which passes into the driving chambers of the quantity divider 64, i.e. the two inlet-side chambers of the double gear pump 65, 66. As a result the quantity divider is driven, i.e. the two gear pairs rotate in opposition and sealed, meshing manner with the shafts 67 and deliver the cooling lubricant on the outlet side, i.e. into chambers 69, 70. Due to the mechanical coupling of the two gear pairs through the shafts 67, the same cooling lubricant quantity is fed into both chambers 69, 70, once again apart from leaks. Despite a common supply line, the two outlets are pressure-decoupled in the longitudinal holes 57, 58, but are quantitatively coupled together. By means of the same quantity divider structure it is possible to separate from one another random partial quantities and, should this prove necessary, can place the volume thereof in a specific ratio, which need not always be 1:1.

Other quantity divider constructions are also possible, e.g. based on the plunger cell pump principle. As such quantity dividers can be constructed in uncomplicated, very compact manner, they are particularly suitable for use in an adapter. However, a quantity divider can also be provided outside the spindle arrangement or drilling device. The advantage of the arrangement described is that only one rotary duct is required for a single cooling lubricant strand.

Figure 11:
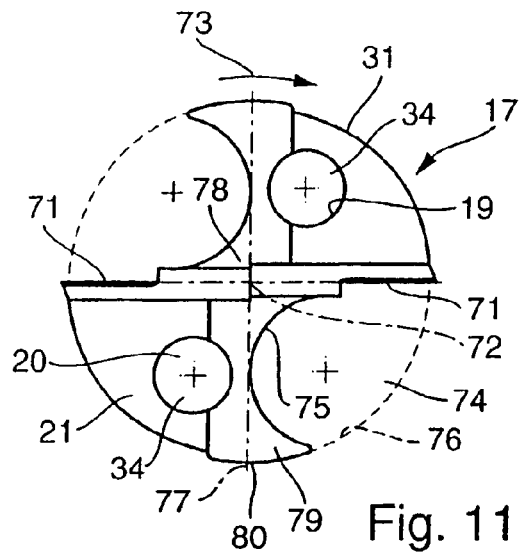
FIG. 11 A front view of the working side of a deep drilling tool.

FIG. 11 is a plan view of the end face 21 of a deep drilling tool 17 or, more precisely, the hard material cutting head 31 (cf. also FIG. 5). There are two blades 71 extending symmetrically to either side of the drilling tool centre 72. The end face 21 is generally somewhat conical under a blade angle conventionally used for deep drilling tools and which is usually between 20 and 45ø, measured with respect to a plane on which the drill axis 56 stands perpendicularly. This is the angle assumed by the blades. In special cases the blade angle can also be 0ø, e.g. for producing a flat hole bottom in a blind hole. The remaining part of the end face is set back somewhat for creating a clearance angle. In the outer area the blades 71 are bounded by an axially directed edge, whereas in the central area where the drill "presses" due to lower circumferential speeds, they have a roof-shape.

Upstream of the blades 71 in the working rotation direction 73 is in each case formed a chip chamber or space 74, which is bounded by one of the two blades 71, a side wall 75 and a worked hole or bore wall 76 indicated in broken line form. The side wall, which extends from the blade up to the bore wall 76, is rounded and extends up to a vertical transverse plane 77 through the drill centre 72. Thus, the chip space 74 formed has a size of almost a quarter of the cross-section, the angles or corners of said sector being generously rounded. In FIG. 11 the side wall is virtually a semicircle around a centre point positioned roughly centrally in the chip space. Thus, in the vicinity of the centre, is formed an admittedly narrow, but very strong central web 78 as a result of the generous rounding and is traversed in inclined manner by the two blades. The rounded side wall forms an arcuate, triangular projection 79, which could also be referred to as a gusset, which extends the circumferential line left behind of the cutting head in the direction of the chip space. In this area and somewhat beyond the central plane 77 is formed a guide zone 80, namely through a circumferential line substantially precisely corresponding to the desired bore or hole diameter and which is limited to the vicinity of the guide zone and the blade ends, whereas the cutting head circumference in the remaining area is set back by a small amount compared therewith (1/100 to 1/10 mm).

In the vicinity of the end face 21 "left behind" in the area between the chip spaces 74 are provided the openings 34 of channels 19, 20, which allow the discharge of cooling lubricant just behind the in each case leading blade and which subsequently enters the chip space 74 and carries the chips produced there by the blade 71 through the following removal channels 35, 36.

Figure 12:
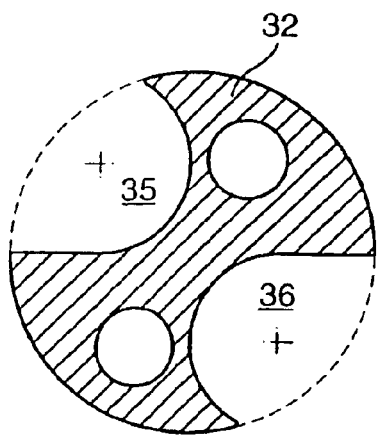
FIG. 12 A section through the associated pipe section forming the drill shank.

FIG. 12, which is a cross-section through shank 32, shows the removal channels. It can be seen that the removal channels, like the supply channels, have in the shank area the same shape and arrangement as in the vicinity of the cutting head.

The advantage of the rounded shape of the chip space 74 and removal channels 35, 36 is that the chip helixes particularly forming with very tough and therefore long-chip materials cannot become attached as a result of the rounding and instead in the virtually circular chip and removal area pass in the form of a helix to the outlet in the vicinity of the clamping head.

Figure 13:
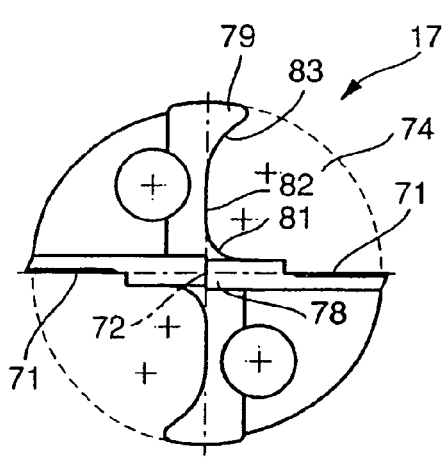
FIGS. 13, 14 & 15 Views corresponding to FIG. 11 of differently designed drills.

FIG. 13 shows a view corresponding to FIG. 11 for which all the features of the latter apply, with the exception of the shape of the rounded side wall 75. Instead of being virtually a semicircle as in FIG. 11, it is here constructed as a half flat oval. Close to the centre of the blade 71 is connected a radius 81 which is smaller than that in FIG. 11. Thus, web 78 is even narrower. Following a short, straight intermediate piece 82 is then connected a somewhat larger radius 83, which also forms a projection 79, but which is somewhat smaller than in FIG. 11. Here again the chip space 74 is well rounded and sufficiently large to remove in blockage-free manner the chips produced by the blade.

Figure 14:
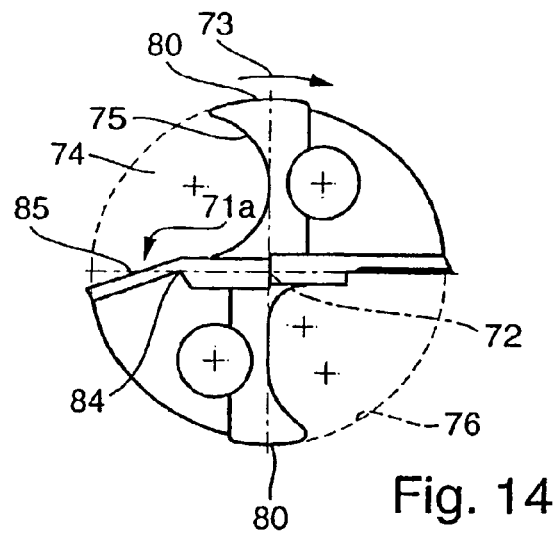

FIG. 14 shows a construction which, in the lower right-hand part is similar to that of FIG. 13, whereas in the upper, left-hand part has a modified structure with respect to the blade shape.

At some distance from the centre 72, the blade 71a has a bend 84 (considering the front side, i.e. according to FIG. 14). Based on the working rotation direction 73 of said tool (clockwise), the upper blade part 85 is tilted rearwards, so that the extension of the blade now passes somewhat above the centre instead of close to the latter. As the wall of the chip space 74 axially adjacent to the blade is adapted to the blade shape, i.e. is also "cut away" there, the chip space opens even further towards this side. The auxiliary blade can preferably assume one to two quarters of the total length of the blade 71a (cutting head radius), particularly approximately half.

As a result of this construction two advantages are obtained. Firstly, as a result of the bent shape of the blade the chip is longitudinally broken, i.e. two narrower chips are formed which, also due to the transverse forces resulting from the bend, tear or break more easily. Secondly as a result of the fact that one blade is straight and the other bent, a certain transverse force is produced which, as a function of the conditions, presses one of the two guide surfaces 80 onto the bore wall 76, without neutral intermediate phases arising in which the tool could become "unsteady". Otherwise the side wall 75 is constructed in the upper, left-hand area in accordance with FIG. 11.

Figure 15:
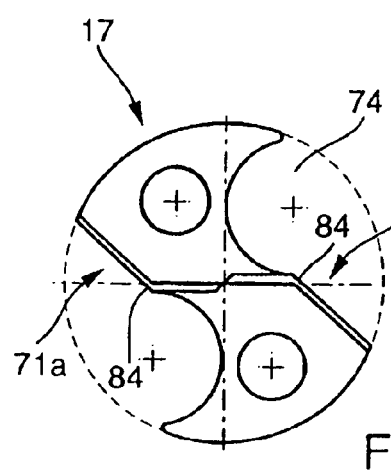
Figure 16:
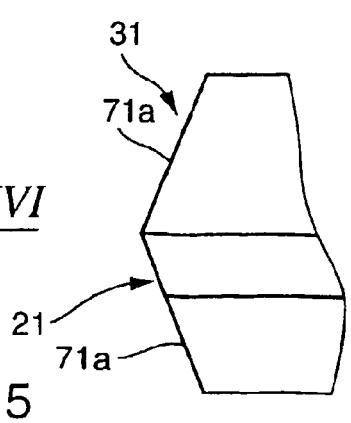
FIG. 16 A view of the drill in the direction of arrow XVI.

FIGS. 15 and 16 show a construction in which the two blades 71a are constructed with a bend 84, top left in FIG. 14. Thus, here on both sides a very large, open chip space 74 is formed and on both sides the chips are kept narrow and short in the above-described manner.

FIG. 16 shows that despite the bend the side view of the cutting head 31 is substantially roof-shaped, the basic shape of the end surface 21 consequently being conical. Express reference is made to the drawings concerning the precise design and dimensions, particularly of the blades, chip spaces and removal channels.

Function

On the basis of FIG. 1, the drilling device fixed in a drilling spindle 15 is applied to a workpiece and the said spindle is rotated by a not shown motor. Motor 27 is started up, so that it forces cooling lubricant via supply lines 23, 24 into the drilling device and consequently through the axial channels 19, 20 and to the cutting head openings 34. The drill, which is normally guided at its workpiece-near end in a drill bush, is then moved up to the workpiece, up to which the headstock 14 on the carriage guide 13 is moved by an infeed drive. The two blades work into the workpiece and cut the same. The chips are carried by the cooling lubricant through the chip spaces 74 and the removal channels 35, 36 in shank 72 and are discharged just before the end of the drill, i.e. upstream of the clamping head. For this purpose the drilling device has a not shown chip container, where the cooling lubricant is collected again and optionally in reconditioned form returned to the tank 29.

Normally the counterpressure in both supply channels 19, 20 is the same, so that even without the separate supply via the two pumps 25, 26 the pressure and volume in both channels would be identical. However, if clogging or some other obstacle occurs, particularly in the chip space or removal channels, the pressure in said zone rises. Due to the independent, substantially volume-constant cooling lubricant supply to each individual channel, in the clogged channel, instead of a reduction in the flow quantity, the pressure is significantly increased until the blockage is flushed clear.

In the construction according to FIG. 10 with a quantity divider, the boring device has only one pump and one supply line 63. The two independent, substantially identical volume flows with optionally a different pressure level are produced by the quantity divider in the manner described relative to FIG. 10.

FIGS. 11 to 16 show that through the rounded side wall 75 or 81, 82, 83 of chip spaces 74 and the in any case preferably identically constructed removal channels 35, 36 in shank 32, the clogging risk is relatively low and this is further aided by the bent blade 71a. As a result, the cut chips are longitudinally broken apart substantially in the centre. The drilling tools permit a heavy duty operation, even in the case of otherwise difficult to drill, long-chip material.

The invention claimed is:

1. A drilling device comprising:
   a multiblade drilling tool having a cutting zone with at least two blades, the drilling tool having:
      at least two internal supply channels by means of which cooling lubricant is supplied to the cutting zone, the supply channels passing through the full length of the drilling tool; and
      at least two external removal channels in addition to the supply channels, wherein the cooling lubricant and chips are removed from the cutting zone by means of the removal channels, the removal channels being formed by cutouts on the outside of the drilling tool,
      wherein each of the at least two internal supply channels is individually associated with only one of at least two independent cooling lubricant devices.

2. The drilling device according to claim 1, wherein the supply devices are constructed for maintaining predetermined, separate volume flows of the cooling lubricant for the individual channels.

3. The drilling device according to claim 1, wherein the supply devices are constructed for increasing the cooling lubricant pressure in the case of a reduction of the volume flow in one of the channels as a result of a blockage.

4. The drilling device according to claim 1, wherein independent pumps or pump chambers are connected to the channels.

5. A drilling device comprising a multiblade drilling tool having:
   at least two supply channels by means of which cooling lubricant is supplied to the cutting zone; and
   removal channels, wherein cooling lubricant and chips are removed from the cutting zone by means of the removal channels,
   wherein the supply channels are associated with independent cooling lubricant supply devices, and are connected to the outlets of a quantity divider.

6. The drilling device according to claim 1, wherein the cooling lubricant supply is located in a drilling spindle or an adapter.

7. The drilling device according to claim 1, further comprising a rotary duct for the cooling lubricant.

8. The drilling device according to claim 1, wherein the introduction of the cooling lubricant into the drilling tool or drilling spindle takes place radially, axially, or radially and axially.

9. The drilling device according to claim 1, wherein chip spaces having a rounded side wall in cross-section are located adjacent and upstream of the blades in a working rotation direction of the multiblade drilling tool, the chip spaces being connected to the removal channels.

10. The drilling device according to claim 9, wherein the chip removal channels also have a rounded side wall.

11. The drilling device according to claim 9, wherein the rounded side wall extends approximately up to a drilling tool centre plane perpendicular to the blade.

12. The drilling device according to claim 11, wherein, in the vicinity of the drilling tool external diameter, the rounded side wall bounds a substantially circumferentially directed projection projecting into the chip space.

13. The drilling device according to claim 9, wherein the rounded side wall has the cross-sectional shape of a semicircle or half a long oval.

14. The drilling device according to claim 1, wherein at least one of the blades of the multiblade drilling tool, considered in an axial plan view on the drilling tool end face, has two blade sections that meet at an angle to form a bend.

15. The drilling device according to claim 9, wherein the drilling tool has a cutting head and a shank applied thereto, the shank having recesses forming chip removal channels, wherein the cross-sectional shape of the chip removal channels is the same as the cross-sectional shape of the chip spaces.

16. A drilling device comprising:
   a multiblade drilling tool having a cutting zone with at least two blades, the drilling tool having:
      at least two internal supply channels by means of which cooling lubricant is supplied to the cutting zone, the supply channels passing through the drilling tool; and
      at least two external removal channels in addition to the supply channels, wherein the cooling lubricant and chips are removed from the cutting zone by means of the removal channels, the removal channels being formed by cutouts on the outside of the drilling tool,
      wherein the supply channels are associated with independent cooling lubricant devices, the drilling device further comprising an adapter with independent cooling lubricant infeeds in two separate supply channels in the drilling tool.

17. A drilling device comprising multiblade drilling tool having:
   at least two supply channels by means of which cooling lubricant is supplied to the cutting zone;
   removal channels, wherein cooling lubricant and chips are removed from the cutting zone by means of the removal channels; and
   an adapter with independent cooling lubricant infeeds in two separate supply channels in the drilling tool,
   wherein the supply channels are associated with independent cooling lubricant supply devices, and
   wherein a quantity divider is provided in the adapter.

18. The drilling device according to claim 16, wherein the adapter contains a chuck for the drilling tool.

19. The drilling device according to claim 1, wherein a drilling spindle is mounted in a headstock and there is a separate cooling lubricant infeed for the two channels into the drilling spindle.

20. The drilling device according to claim 1, wherein the multiblade drilling tool is a deep drilling tool.

21. The drilling device according to claim 1, wherein the drilling tool has exactly two blades and exactly two supply channels, wherein each blade is associated with a supply channel.

22. The drilling device according to claim 6, wherein the drilling spindle or adapter contains a quantity divider.

23. The drilling device according to claim 22, wherein the drilling spindle or adapter contains the chuck for the drilling tool.

24. The drilling device according to claim 19, wherein the cooling lubricant infeed is located at the end of the drilling spindle remote from the drilling tool.

25. The drilling device according to claim 14, wherein the bend has an angle between 170° and 120°.

* * * * *